United States Patent
Babbitt et al.

(10) Patent No.: US 9,581,165 B2
(45) Date of Patent: Feb. 28, 2017

(54) SYSTEMS AND METHODS FOR AVIAN MITIGATION FOR WIND FARMS

(75) Inventors: Victor Babbitt, Superior, CO (US); Andrew G. Oliver, Longmont, CO (US); Jeffrey W. Fine, Grand Junction, CO (US); Daniel Ives, Broomfield, CO (US); Alexander D. Brand, Westminster, CO (US)

(73) Assignee: RENEWABLE ENERGY SYSTEMS AMERICAS INC., Broomfield, CO (US)

(*) Notice: Subject to any disclaimer, the term of this patent is extended or adjusted under 35 U.S.C. 154(b) by 986 days.

(21) Appl. No.: 13/878,810

(22) PCT Filed: Oct. 13, 2011

(86) PCT No.: PCT/US2011/056227
§ 371 (c)(1),
(2), (4) Date: Jul. 12, 2013

(87) PCT Pub. No.: WO2012/054313
PCT Pub. Date: Apr. 26, 2012

(65) Prior Publication Data
US 2013/0280033 A1 Oct. 24, 2013

Related U.S. Application Data

(60) Provisional application No. 61/455,347, filed on Oct. 19, 2010.

(51) Int. Cl.
*F03D 7/00* (2006.01)
*G01S 13/88* (2006.01)
(Continued)

(52) U.S. Cl.
CPC ......... *F04D 15/0066* (2013.01); *A01K 11/006* (2013.01); *A01K 11/008* (2013.01);
(Continued)

(58) Field of Classification Search
CPC ........ G01S 5/0018; G01S 5/0009; G01S 5/02; G01S 5/0294; G01S 13/04; G01S 13/06; G01S 13/74–13/758; F03D 7/00; F03D 17/00; F03D 80/00; A01K 11/00; A01K 11/004; A01K 11/006; A01K 11/008; A01M 29/00
(Continued)

(56) References Cited

U.S. PATENT DOCUMENTS 4,087,791 A * 5/1978 Lemberger .............. F42B 12/36
340/10.33
4,730,188 A * 3/1988 Milheiser ........... G06K 19/0723
340/10.4
(Continued)

FOREIGN PATENT DOCUMENTS

DE 10231299 A1 1/2004
DE 102007004027 A1 7/2008
(Continued)

OTHER PUBLICATIONS

PCT International Search Report for PCT International Application No. PCT/US2011/056227, mailed Mar. 8, 2012.

*Primary Examiner* — Peter Bythrow
(74) *Attorney, Agent, or Firm* — Nixon & Vanderhye, P.C.

(57) ABSTRACT

A wildlife detection system includes a tracking device, a receiver, and a wildlife deterrent system. The tracking device may be mounted to a wildlife. The receiver is configured to track movement of the tracking device relative to an object of danger to the wildlife. The wildlife deterrent system is configured to reduce risk of danger to the wildlife in response to movement of the wildlife within a predetermined distance from the object of danger as tracked by the receiver.

8 Claims, 10 Drawing Sheets

(51) Int. Cl.
| | |
|---|---|
| *F04D 15/00* | (2006.01) |
| *A01K 11/00* | (2006.01) |
| *A01M 29/00* | (2011.01) |
| *A01M 31/00* | (2006.01) |
| *G01S 13/75* | (2006.01) |
| *G01S 5/00* | (2006.01) |

(52) U.S. Cl.
CPC .......... *A01M 29/00* (2013.01); *A01M 31/002* (2013.01); *F03D 7/00* (2013.01); *F03D 17/00* (2016.05); *F03D 80/00* (2016.05); *G01S 13/75* (2013.01); *G01S 5/0009* (2013.01); *G01S 13/88* (2013.01); *Y02E 10/72* (2013.01)

(58) Field of Classification Search
USPC .......................................... 342/42, 61, 175
See application file for complete search history.

(56) References Cited

U.S. PATENT DOCUMENTS

| | | | | | |
|---|---|---|---|---|---|
| 4,952,939 | A * | 8/1990 | Seed | ............... | G01S 13/003 340/552 |
| 5,252,962 | A * | 10/1993 | Urbas | ............... | A61B 5/0008 128/903 |
| 5,382,952 | A * | 1/1995 | Miller | ............... | G01S 13/758 235/440 |
| 5,448,243 | A * | 9/1995 | Bethke | ............... | G01S 13/87 342/29 |
| 5,774,088 | A * | 6/1998 | Kreithen | ............... | A01K 15/02 342/22 |
| 6,204,765 | B1 * | 3/2001 | Brady | ............... | G01S 11/06 340/10.1 |
| 6,360,698 | B1 * | 3/2002 | Stapelfeld | ............... | A01K 15/023 119/720 |
| 6,575,120 | B1 * | 6/2003 | Stapelfeld | ............... | A01K 15/023 119/720 |
| 6,653,971 | B1 * | 11/2003 | Guice | ............... | A01M 1/026 342/22 |
| 7,479,884 | B1 * | 1/2009 | Fullerton | ............... | G01S 13/003 340/572.1 |
| 7,646,330 | B2 * | 1/2010 | Karr | ............... | G01S 13/765 340/10.1 |
| 7,864,103 | B2 * | 1/2011 | Weber | ............... | G01S 7/003 342/118 |
| 7,948,429 | B2 * | 5/2011 | Drake | ............... | G01S 7/024 342/188 |
| 8,344,937 | B2 * | 1/2013 | Drake | ............... | G01S 7/024 342/159 |
| 8,502,730 | B2 * | 8/2013 | Roche | ............... | G01S 7/415 342/26 D |
| 8,742,977 | B1 * | 6/2014 | Piesinger | ............... | A01M 29/16 342/159 |
| 2004/0246099 | A1 * | 12/2004 | Tuttle | ............... | G01S 13/758 340/10.1 |
| 2006/0061469 | A1 * | 3/2006 | Jaeger | ............... | B60R 25/00 340/539.13 |
| 2007/0046461 | A1 * | 3/2007 | Radmand | ............... | G06K 17/00 340/539.13 |
| 2008/0260531 | A1 * | 10/2008 | Stommel | ............... | A01M 29/18 416/31 |
| 2009/0051491 | A1 * | 2/2009 | Lu | ............... | H04B 5/0087 340/10.1 |
| 2009/0185900 | A1 * | 7/2009 | Hirakata | ............... | F03D 7/0264 416/1 |
| 2010/0194603 | A1 * | 8/2010 | Wobben | ............... | F03D 80/10 340/983 |
| 2010/0207765 | A1 * | 8/2010 | Brander | ............... | G06K 7/0008 340/572.1 |
| 2011/0102154 | A1 * | 5/2011 | Hindhede | ............... | A01K 29/005 340/10.1 |
| 2011/0285581 | A1 * | 11/2011 | Hol | ............... | F03D 11/00 342/25 F |
| 2013/0257641 | A1 * | 10/2013 | Ronning | ............... | G01S 13/42 342/54 |
| 2014/0148978 | A1 * | 5/2014 | Duncan | ............... | A01M 29/10 701/3 |

FOREIGN PATENT DOCUMENTS

| | | |
|---|---|---|
| DE | 102009035072 A1 | 2/2011 |
| EP | 1531444 A2 | 5/2005 |
| WO | 2007093570 A1 | 8/2007 |

\* cited by examiner

SYSTEMS AND METHODS FOR AVIAN MITIGATION FOR WIND FARMS

RELATED APPLICATIONS

This application claims priority from provisional U.S. patent application Ser. No. 61/455,347 filed Oct. 19, 2010.

TECHNICAL FIELD

The present disclosure relates to systems and methods for reducing risk to fowl and animals residing in proximity to structures such as wind farms and vehicles.

BACKGROUND

Spinning turbine blades for utility scale wind farms are considered by some to be a risk to birds that may pass through the surface swept by the turbine blades. Modern wind turbine and blade designs have reduced this risk greatly, primarily by designs that result in much slower blade rotation speeds. In the permitting process for wind farms, avian studies are undertaken to ascertain the potential for bird kills related to migrating birds, and changes made to turbine siting or other design issues to reduce the impact of the wind farm to passage birds.

However, government entities may require more active mitigation systems for certain protected bird or bat species. An example of this is the golden eagle, for which special mitigation methods may be required to be demonstrated before certain government entities will permit installation of the wind farm. Mitigation techniques under evaluation include the use of radar to locate birds entering the boundaries of a wind farm, and adjust the turbines based on the assumed flight path of such a bird.

However, while the ability to shut down specific wind turbines may reduce risk to birds, the aforementioned systems cannot generally classify a radar target as a specific species. These systems, for instance, cannot generally classify a golden eagle separately from a common turkey vulture or a large raven or other species that are not endangered or protected. This may result in a wind farm being shut down or curtailed far more often than the mitigation against a particular species of bird requires.

Government agencies allow the capture and light weight tagging of some species of wildlife to allow identification of that particular wildlife. An example of this might be the tagging of all golden eagles known to be nesting within 10 miles of the borders of a proposed wind farm. However, available tracking tags, such as GPS and VHF radio tags, are generally heavy, and will not remain active for the life of many birds (e.g., golden eagles often live up to 30 years in the wild). Solar powered tags have been introduced, but have been shown to have a high failure rate due to bird preening, debris on the solar cell, and other issues. Repeatedly capturing and tagging these birds may have detrimental consequences to the birds greater than the perceived risks of wind turbine blades that are being avoided by the use of tags. In addition, some animals such as golden eagles may be successfully captured and tagged once, but learn quickly to avoid similar capturing methods, and it may be very difficult to capture these animals multiple times.

In addition, GPS tags are designed to show the path of the bird only after the GPS has been recovered. Certain Argos (satellite system) GPS tags will return the location of the bird while still in flight, but only to a precision of about 250 to 1500 meters. GPS tags typically have a lengthy delay before data is received as to position, which would not be suitable for real time tracking of wildlife. VHF or GPS tags, which may be designed for battery life of up to 3 years, generally weigh a minimum of 30 grams. The weight and required mounting of these types of tags may have detrimental effects on a bird's life.

Opportunities exist for tracking birds and animals relative to dangerous situations such as wind turbines and roads to mitigate harm to such birds and animals.

DISCLOSURE OF THE INVENTION

According to at least one embodiment, a wildlife detection system includes a tracking device, a receiver, and a wildlife deterrent system. The tracking device is mounted to a wildlife. The receiver is configured to track movement of the tracking device relative to an object of danger to the wildlife. The wildlife deterrent system is configured to reduce risk of danger to the wildlife in response to movement of the wildlife within a predetermined distance from the object of danger as tracked by the receiver.

In one example, the tracking device may include a passive harmonic radar tag. The passive harmonic radar tag may include a plurality of dipole antennae. The tracking device may include an unpowered active tag. The wildlife detection system may include a radar or other transmitter configured to generate a radar field at a first frequency. Positioning the tracking device in the radar field causes the tracking device to radiate a radar signal at a second frequency that is received by the receiver.

The wildlife detection system may include a radar configured to generate a radar field that powers the tracking device to generate a signal that is received by the receiver. The wildlife detection system may comprise a controller that controls operation of the object of danger when the wildlife is within a predetermined distance. The wildlife detection system may include a transmitter configured to generate a signal that is received by the tracking device, wherein the tracking device emits a signal that is received by the receiver to determine a location of the wildlife. The radar may include a frequency modulated continuous wave radar configured to emit electromagnetic radiation. The radar may include a pulse radar configured to emit intermittent bursts of radiation. The tracking device may include a half-wave dipole resonant radar tag.

Another aspect of the present disclosure relates to a computer-implemented method for tracking wildlife. The method includes providing a transmitter, a receiver, a controller, and a tracking device mounted to a wildlife. The method also includes generating an energy field with the transmitter, generating a signal with the tracking device when the wildlife enters the energy field, receiving the signal at the receiver, and determining a location of the wildlife relative to a reference point. If the wildlife is within a predetermined distance of the reference point, the method further includes delivering a signal to the controller and generating a command with the controller to mitigate danger for the wildlife.

The tracking device may include a passive harmonic radar tag that re-radiates a signal at a different frequency than a frequency of the energy field. The tracking device may include an unpowered active tag that is powered by the energy field. The receiver may determine the location of the wildlife relative to the reference point. The command may include slowing down a wind turbine if the wildlife is a bird. The command may include generating a traffic signal if the wildlife is an animal.

Another aspect of the present disclosure relates to a computing device configured to track location of wildlife. The computing device includes a processor, memory in electronic communication with the processor, and a receiver module. The receiver module is configured to receive signals from a tracking device mounted to a wildlife, determine a location of the wildlife relative to a reference point, and deliver a command signal to a device that is operable to reduce danger for the wildlife when the location of the wildlife is within a predetermined distance from the reference point.

The computing device may further include a transmitter module configured to generate an energy field that activates the tracking device to generate the signals. The receiver module may include an analyzing module configured to determine the location of the wildlife.

Another aspect of the present disclosure relates to a computer-readable program configured to track location of wildlife. The computer-readable program includes a non-transitory storage medium including instructions thereon. The instructions include code to receive signals from a tracking device mounted to a wildlife, code to determine a location of the wildlife relative to a reference point, and code to deliver a command signal to a device that is operable to reduce danger for the wildlife when the location of the wildlife is within a predetermined distance from the reference point.

Another aspect of the present disclosure relates to a radiosonde tracking system that includes a free floating balloon exposed to wind, a tracking device mounted to the balloon, and a receiver configured to track movement of the tracking device relative to a reference point. The receiver includes a receiver module operable to compute a speed of the wind based on a position of the balloon relative to the reference point as the balloon floats upward upon release.

The tracking device may include a passive harmonic radar tag or an unpowered active tag. The tracking system may include a radar configured to generate a radar field at a first frequency, wherein positioning the tracking device in the radar field causes the tracking device to radiate a signal at a second frequency that is received by the receiver. The tracking system may include a radar configured to generate a radar field that powers the tracking device to generate a signal that is received by the receiver.

A further aspect of the present disclosure relates to a method of tracking animals that includes providing a transmitter, a receiver, and a passive tag embedded in an adhesive material, shooting the passive tag at an animal, connecting the passive tag to the animal with the adhesive material, transmitting a signal with the transmitter that causes the passive tag to radiate a return signal at a different frequency than the transmitter, and receiving the return signal with the receiver and determining a location of the animal relative to a reference point.

The method may also include creating an animal deterrent when the animal moves within a predetermined distance of the reference point. The passive tag may be one of a passive harmonic radar tag and an unpowered active tag, wherein the passive tag is powered by the signal from the transmitter. The animal may be one of a bovine, equine, elk, moose, deer, or animals dangerous to humans such as lions, tigers, jaguars, and cape buffalo. The adhesive material is in the form of a bullet and shooting the passive tag includes shooting the passive tag with a gun. Connecting the passive tag to the animal may include connecting the adhesive material to hair, skin or fur on an exterior of the animal. The animal deterrent may include at least one of flashing lights and sound. The reference point may be a road, and the method further includes creating a warning signal to drivers on the road when the animal moves within a predetermined distance of the road.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

BEST MODE(S) FOR CARRYING OUT THE INVENTION

The present disclosure is directed to a method for locating moving objects using a radar or radio fence. It is contemplated that the systems and methods of the present disclosure could be used for bird and bat species, to track individual animals or objects near wind farm turbines, or to track near other industrial equipment that might be detrimental to an animal of interest, including high voltage transmission and distribution lines, substations and other distribution equipment, and power generation stations. In addition, it also contemplated that the systems and methods of the present disclosure could be used to track ground based mammals and reptiles for similar reasons such as avoidance and early detection of large animals on roadways passing through natural habitat or migration pathways, or detection and avoidance of animals dangerous to persons. Furthermore, the systems and methods disclosed herein could be used to perform general functions of interest to field biologists and meteorologists by attaching a passive tag or unpowered active tag to small balloons for the purpose of characterizing the vertical wind profile as it rises. It is contemplated further that the systems and methods disclosed herein could be used to discriminate authorized personnel or vehicles at a secure facility from unauthorized personnel or vehicles. It is further contemplated that the systems and method disclosed herein could be used for maritime use, to identify authorized vessels, and many other uses.

In one example, a tracking system uses a passive tag for attachment to wildlife or other object in question to help determine proximity of the wildlife or other object to a reference point. The tag may be lightweight and requires no battery or other energy storage device, and may remain on the wildlife or object indefinitely. The tag may be designed to be used in cooperation with radar or a radio field 'fence' that allows the tag to, for example, return a detectable signal that helps identify the wildlife or object that has been previously tagged.

Two primary embodiments of this tag are described herein: 1) a passive harmonic radar tag, and 2) an unpowered active tag. In one example, a tagged bird is scanned by radar associated with a wind farm, or encounters a radio field 'fence' near a wind farm. The radar or radio field is emitted at a first frequency. When the tagged bird moves into the radar or radio field, a passive harmonic tag will receive the first frequency and re-radiate energy at a different second frequency. In one example, the second frequency is about twice the first radar frequency. When an unpowered active tag encounters a radar or radio field, the unpowered active tag uses energy derived from the radar or radio field to power an active return signal (e.g., a "blip") that identifies the tagged bird as a previously tagged object. The active return signal may carry information that identifies the tagged bird.

The system may include capabilities to determine relative location between the tag carried by the wildlife (i.e., bird or animal) and a reference point such as, for example, a wind turbine or road. The system may also be operable to send a command signal to one or more mitigation devices such as, for example, a braking system for a wind turbine, or a road block or traffic light for a road. The system may be configured to perform other functions and operations in response to determining a location of the tag.

Figure 1:
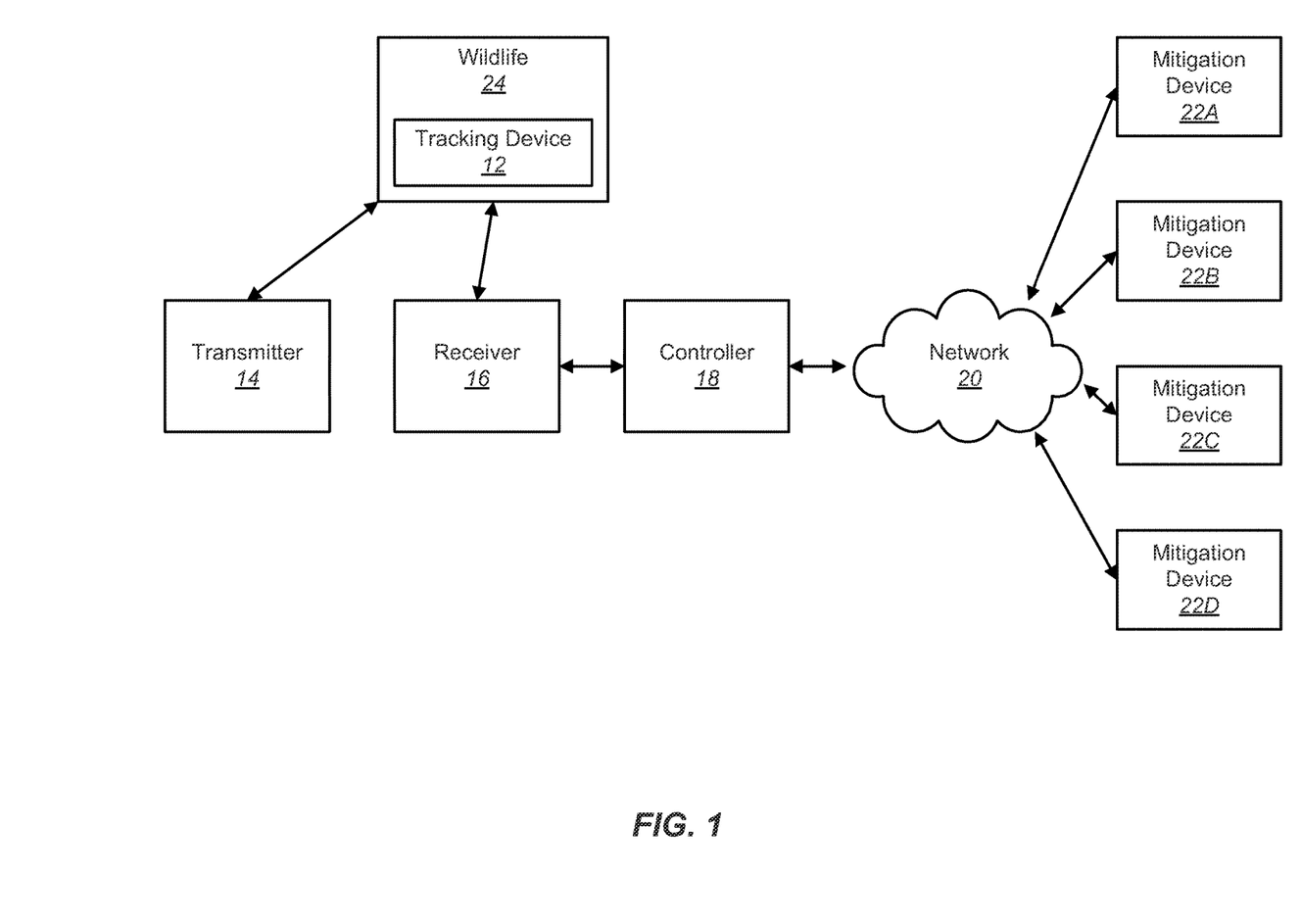
FIG. 1 is a block diagram of an example tracking system in accordance with the present disclosure.

Referring now to FIG. 1, an example tracking system 10 is shown and described. The tracking system includes a tracking device 12, a transmitter 14, a receiver 16, a controller 18, and a plurality of mitigation devices 22A-D. The tracking device 12 is carried by, for example, a wildlife or other object such as a weather balloon as described below. The tracking device 12 may include any one of the tags described above including, for example, a passive harmonic radar tag or an unpowered active tag. Typically, the tracking device 12 is mobile and the tracking system 10 is operable to determine a location of the tracking device relative to a reference point.

The transmitter 14 is configured to transmit a signal such as a radar or radio signal that produces an energy field (also referred to as a radar or radio field) having a frequency. The tracking device 12 responds to the signal sent by the transmitter 14 and produces a responsive signal that is received by the receiver 16. The receiver 16 may include a number of modules as described below with reference to FIG. 2 to help determine a location of the tracking device 12. The receiver 16 may generate a command signal or other instructions for use by the controller 18. The controller 18 may control the plurality of mitigation devices 22A-D via any desired communication such as, for example, via a network 20. The network 20 may comprise a wired or wireless communication between the controller 18 and mitigation devices 22A-D.

In one example, the tracking device 12 includes a passive harmonic radar tag that includes a plurality of dipole antennas in a passive harmonic radar configuration. The passive harmonic radar tag is configured to capture and re-radiate enough energy to provide a signal that is detectable within a desired range of distances. A cross dipole system may be employed to allow signal reactivity in multiple orientations of the tag. Passive harmonic radar tags may include a plurality of antennas that are oriented orthogonal to each other, such that regardless of the orientation of the tag, at least one antenna element will be oriented orthogonal to the direction of flux from the radar or radio transmitter. In one example, the desired predetermined distance is in the range of about 0 to 10 miles, more preferably in the range of about 0 to about 1 mile, more preferably in the range of about 0 to 400 meters, which may be a preferable distance to detect a large bird such as a golden eagle in proximity to a wind turbine, or to allow sufficient time to slow the spinning wind turbine blades, if required. In some embodiments, the predetermined distance may be in the range of about 0 to 100 meters, which may be preferable distance when there is a need to warn approaching cars of wildlife such as reindeer, elk, or other large animals in proximity to a road or highway.

A tracking device 12 may comprise a half-wave dipole resonant radar tag micro strip or patch antennas. One function of the antennas is to capture the maximum amount of power from the radar or radio field and deliver as much of that power as possible to a nonlinear diode element. The use of lower radar or radio frequencies results in longer antennas, which may be preferable in certain circumstances, as the lower radar frequencies and resulting longer antennas allow signals to penetrate woods and undergrowth more efficiently. For example, the use of typical X band marine radars for this purpose may require passive harmonic antenna lengths of about 1.25 cm to 1.9 cm in length, but the signal from this antenna would degrade in the presence of trees and undergrowth. An L band radar may require passive harmonic antenna lengths of about 7.5 cm to 15 cm in length, but would penetrate plant growth much better. It is contemplated that the physical antenna size may be smaller if the antenna is coiled in the manner of common patch antennas, at some loss of return signal.

An optimum radar frequency and antenna length may be adjusted for such requirements as length of use for the tag, the size or shape of the object carrying the tag, and expected environmental conditions. In one example, a center-fed, half wavelength resonant dipole provides a broad, single lobe directivity pattern with maximum gain perpendicular to the antenna. The broad lobe construction minimizes performance deprivation typically caused by rotation from a vertical orientation, although dipole antennas of different orientations may be used to compensate for such orientation issues.

A secondary function of the antennas is to collect from the diode as much power as possible at a second harmonic frequency, and radiate this power in a horizontal direction and uniformly in azimuth. In one example, a separate antenna, optimized for this function, may be used with the tag. However, if biological considerations or other characteristics of the object carrying the tag outweigh the importance of optimizing range, then the same dipole may be used to return the signal. In one example, a low barrier Schottky diode may be used as the nonlinear element for a transponder of the tag because of intrinsic low junction capacitances that reduces signal loss at high frequency and its low barrier allows the diode to be turned on by very low induced voltages. It is contemplated that the secondary or return antenna of the tag may be tuned slightly differently for each tag, allowing a positive identification of a particular bird or other object carrying the tag.

Passive harmonic radar tags may be relatively light weight, such as, for an example, in the range of 10 milligrams to 10 grams. In one example, the passive harmonic radar tag has a weight of less than 1 gram, a weight of no more than 5 grams, or a weight of no more than 10 grams.

An unpowered tag for use as the tracking device 12 may supply a signal "blip" when energized by an exterior power source such as the radar or radio energy field produced by the transmitter 14. The unpowered tag may or may not include identification information such as a particular bird identifier or other information about the object being tracked. The tag may be constructed and operable without the use of a battery or other long-term energy storage source. The tag may include a rectenna or similar device that collects radio or radar energy from the transmitter, and transforms the energy into direct current voltage that is used to power the active portion of the tag.

A rectenna is typically classified as a rectifying antenna that directly converts energy (e.g., microwave, radar, or radio energy) into DC electricity. A rectenna typically includes elements that are arranged in a multi-element phase with a mesh pattern reflective element that provides directionality. The simplest rectenna may be constructed from a Schottky diode placed between antenna dipoles, wherein the dipoles are sized to the resonant frequency of the available radar/radio/microwave energy. Schottky diodes may be preferred because they have the lowest voltage drop and highest speed, and therefore waste the least amount of power due to conduction and switching. Rectennas are typically highly efficient in converting energy (radar/microwave/radio) to electricity (e.g., efficiencies in the range of up to 90 percent).

One type of tag that may be used as the tracking device 12 is known as a VHF pulse tag that sends out periodic pulses of radio signal that can be located with a specialized VHF receiver. An example in accordance with the present disclosure includes the use of a rectenna to provide power for the VHF pulse function that would then be received by the receiver 16 to assist in mitigating damage to the wildlife or other object that carries the tracking device 12.

In one example, as the wildlife or other object carrying the tracking device 12 approaches an object (e.g., a wind turbine or road), the tracking system 10 identifies that the tracking device 12 is approaching the object. The tracking system 10 may operate to identify whether the wildlife or other object carrying the tracking device 12 has been previously tagged or can be identified in some other way. At this time, a decision may be made either automatically by the tracking system 10 (e.g., by the receiver 16 and/or controller 18) or manually by an operator as to whether a mitigation action should be taken via one of the mitigation devices 22A-D. In one example, the mitigation action is reducing a rotation speed of a wind turbine using one of mitigation devices 22A-D. In other examples, the mitigation devices 22A-D comprise a deterrent system such as a flashing light, audible noise, repulsive smell, or other deterrent that helps change the path of the wildlife or other object carrying the tracking device 12.

Figure 3:
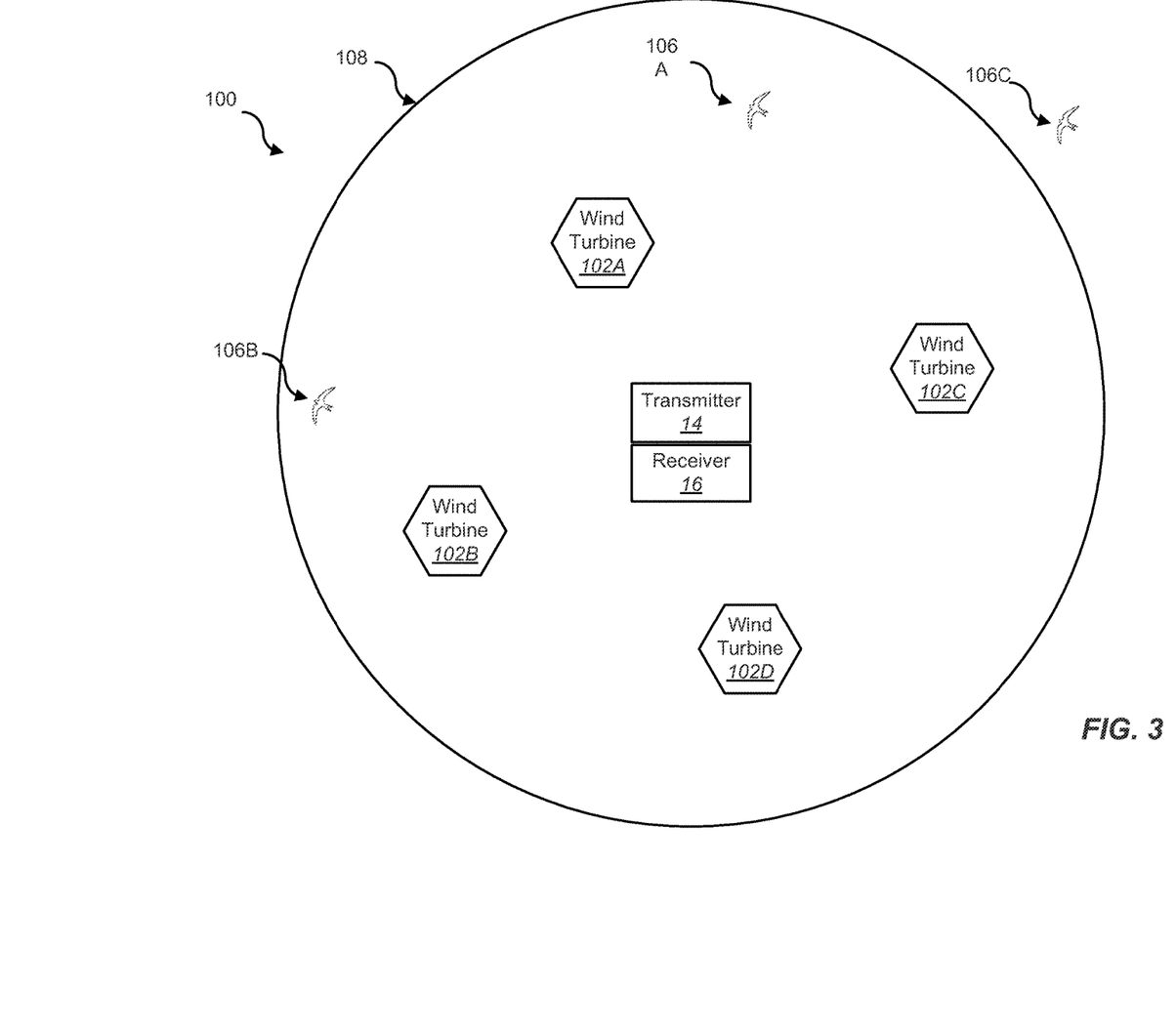
FIG. 3 is a schematic diagram of a wind-turbine tracking system in accordance with the present disclosure.

The transmitter 14 may be configured to transmit a radar, radio, or other type of signal that activates or is otherwise used by the tracking device 12 to create a responsive signal by the tracking device 12 that can be detected by the receiver 16. In one example, radars may be transmitted by the transmitter 14 to create a zone or field (e.g., an energy field) in proximity a reference point such as, for example, an object or structure that poses a danger to a wildlife. FIG. 3 illustrates a wind turbine system 100 that includes a plurality of wind turbines 102A-D and an energy field 108 created around the wind turbines 102A-D by the transmitter 14. The energy (e.g., radar or radio signal) within the energy field 108 may activate one or more tracking devices carried by birds 106A-C (e.g., a wildlife). Once the birds 106A-C are positioned within the energy field 108, the tracking devices 112 carried by the birds 106A-C may be detected by receiver 16 and tracked relative to any one of the wind turbines 102A-D.

In one example, the transmitter 14 produces frequency modulated continuous wave (FMCW) radars that emit a steady stream of electromagnetic radiation. The system 100 tracks the birds 106A-C by modulating the transmission frequency of the radar via the transmitter 14 and comparing the frequency of outgoing signals from the transmitter 14 to returning signals at the receiver 16 received from the tracking devices 12 carried by the birds 106A-C.

This process using the FMCW radars may limit the need for high peak transmitted power while offering higher precision in the measurement of distance or range of the birds 106A-C. In one example, the radar emitted from transmitter 14 includes a pulse radar, which emits short, discreet bursts of high power radiation. The birds 106A-C carrying tracking devices 12 may be tracked using a time lapse between transmission of a signal via transmitter 14 and reception of a return signal from the tracking device 12 via receiver 16. These types of radars may provide production, durability, and cost advantages as compared to FMCW radars. In one example, a pulse radar transmitter provides a high-peak power that increases a harmonic conversion at the tag of the tracking device, and thereby provides for a better harmonic return signal to the receiver 16.

The transmitter 14 may include, for example, a 9.4 GHz transmitter. The receiver 16 may include, for example, an 18.8 GHz receiver. In some arrangements a lower frequency for at least one of the transmitter 14 and receiver 16 may be preferred if the antenna length for the tag of the tracking device 12 does not interfere with the wildlife or other object that carries the tracking device 12. In a passive harmonic radar tag system, it may be useful to have both the transmitting and receiving antenna carefully aligned so that the transmission and reception beams will be closely co-linear over a planned working range. For an unpowered active system, the receiver 16 may be positioned at a location that is not coincident with other features of the system 100 such as, for example, the transmitter 14.

In FIG. 3, any one of the birds 106A-C may be detected with the system 100 depending on, for example, whether the bird 106A-C is carrying a tracking device and whether or not the bird 106A-C is positioned within the energy field 108. Once the system 100 identifies the bird 106A-C (i.e., within the energy field 108), the system 100 may track movement of the bird 106A-C relative to any of the wind turbines 102A-D. A travel path of each bird 106A-C may be determined using, for example, software algorithms or manually by an operator. The system 100 may automatically undertake a risk assessment as to whether or not any of the birds 106A-C will approach any one of the wind turbines 102A-D given its current flight path. A number of factors may be considered before activating one of the mitigation devices of system 100 (e.g., slowing down the rotation of the wind turbines), including, for example, the type of bird, the size of the bird, the flight speed of the bird, and a current condition of the wind turbine (e.g., rotation speed of the wind turbine). Based on any one of these or other factors, a system 100, either automatically or by manual activation generates a command control that is delivered to one or more mitigation devices to limit or reduce danger to the bird.

The system 100 shown in FIG. 3 includes a single energy field 108 associated with a plurality of wind turbines 102A-D. In other examples, a single energy field 108 generated by one or more transmitters 14 may be associated with each individual wind turbine 102A-D. Similarly, a single receiver 16 may be associated with each individual transmitter or wind turbine 102A-D.

Figure 2:
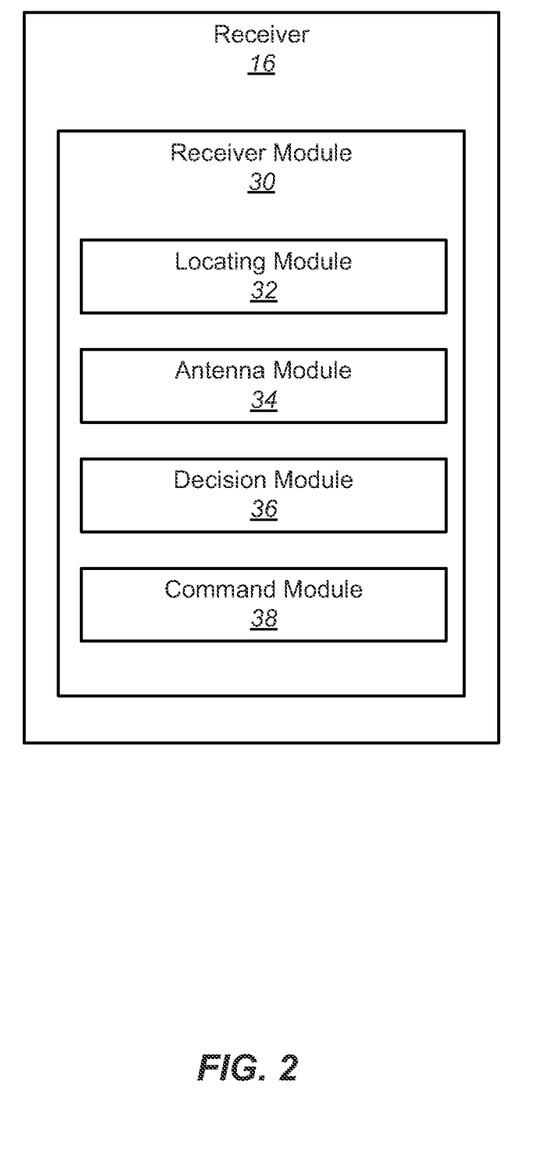
FIG. 2 is a block diagram showing components of a receiver of the tracking system of FIG. 1.

Referring to FIG. 2, the receiver 16 may include a receiver module 30. The receiver module 30 may include a plurality of subcomponents or modules operable to provide desired functionality for the receiver 16 and the related tracking systems disclosed herein. The receiver module 30 may include a locating module 32, an antenna module 34, a decision module 36, and a command module 38. The locating module 32 may function to identify a location of the tracking device from which the receiver receives a signal. The locating module 32 may identify relative location between the tracking device and the receiver 16 as well as determine a location of the tracking device relative to other objects such as an object of danger (e.g., a wind farm or highway), the transmitter 14 or other reference point.

The antenna module 34 may collect or receive signals from a tracking device. The antenna module 34 may route the incoming signals to other modules of the receiver module 30.

The decision module 36 may be operable to collect information from the other modules of the receiver module 30 such as, for example, a location of the tracking device 12, information about the tracking device and the wildlife or object that carries the tracking device (e.g., travel speed and physical properties of the wildlife), a time of day, weather and other information to decide whether to initiate some mitigation that would reduce danger.

The command module 38 is operable to deliver a command signal such as instructions from the receiver module 30 to the controller 18. The command module 38 may include commands that are passed through the controller 18 and through the network 22 to the mitigation devices 22A-D (see FIG. 1). In other arrangements, the command module 38 conveys data or other information that may be used by the controller 18 to formulate a command or instruction for use by the mitigation device 22A-D. In other arrangements, the command module 38 may generate signals that bypass the controller 18 and are used directly by the mitigation device 22A-D.

Figure 4:
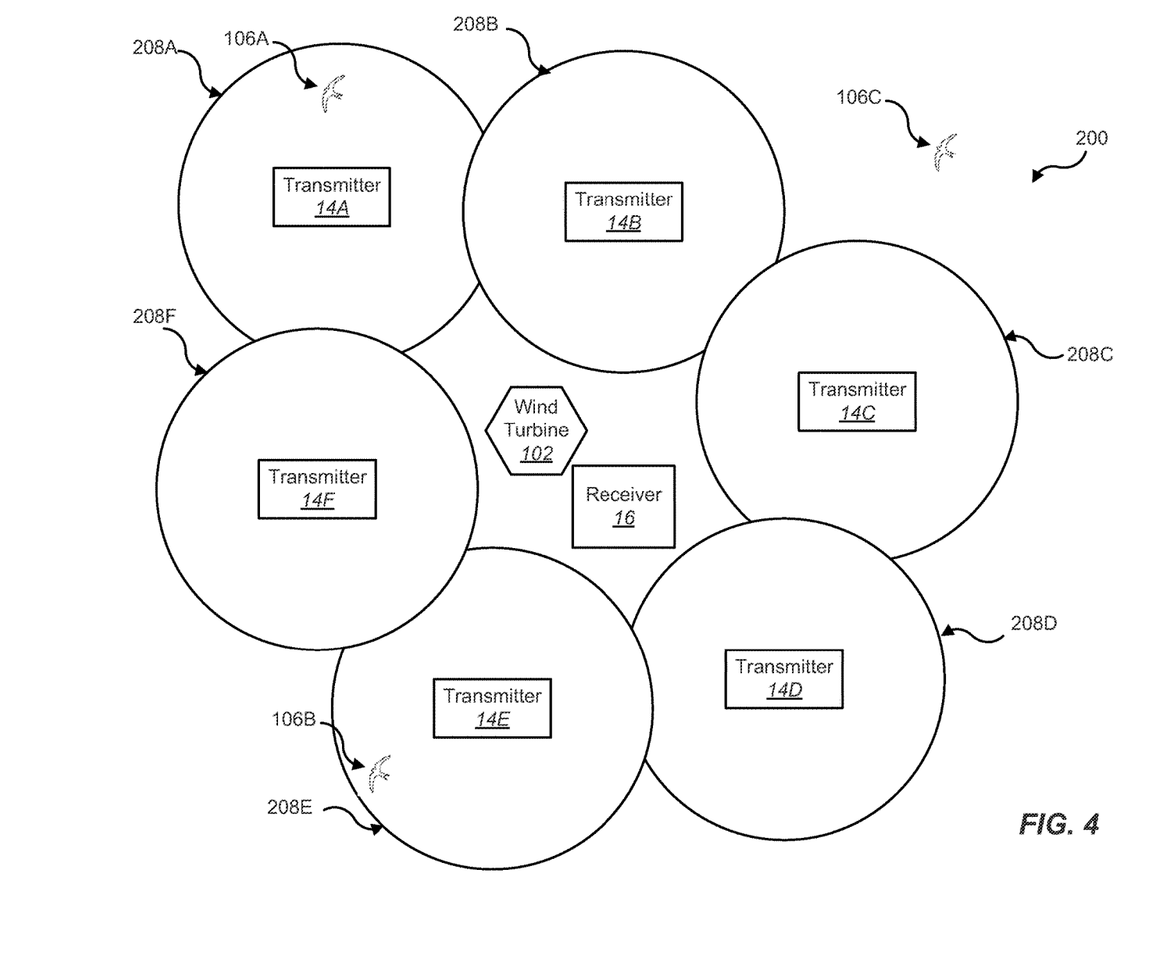
FIG. 4 is a schematic diagram showing another example wind turbine tracking system in accordance with the present disclosure.

Referring to FIG. 4, another example wind turbine tracking system 200 is shown. The wind turbine tracking system 100 includes a plurality of transmitters 14A-F creating a plurality of energy fields or zones 208A-F in proximity to one or more wind turbines 102. A receiver 16 may be positioned in proximity to one or more of the transmitters 14A-F, for example, at a location central to the transmitters 14A-F. The system 200 may help identify a bird or other wildlife 106A-C using a combination of radar or radio signals to create a plurality of energy fields 208A-F and a tag carried by the birds 106A-C. The tag may be part of a tracking device carried by one or more of the birds 106A-C, and is configured to absorb radar or radio energy from the energy fields 208A-F and either reflect back a signal of a different frequency (e.g., via a passive harmonic tag), or utilize the received energy to power a device that broadcasts an active signal that is detectable by the receiver 16. Any signals reflected or generated by the tracking device carried by the birds 106A-C may include identification information for the bird or other object to which the tracking device is mounted.

In one example, in which the tag is unpowered, the tracking device carried by the wildlife or other object may have an indefinite life expectancy with a relative low failure rate because it is operable without the use of a separate power source (e.g., battery). Such tags may also be relatively lightweight as compared to tags that carry a separate power source. Such tags may also limit the need to retag the wildlife or other object carrying the tracking device due to the longer lifetime possible given the technologies for the tag discussed and disclosed herein.

Figure 5:
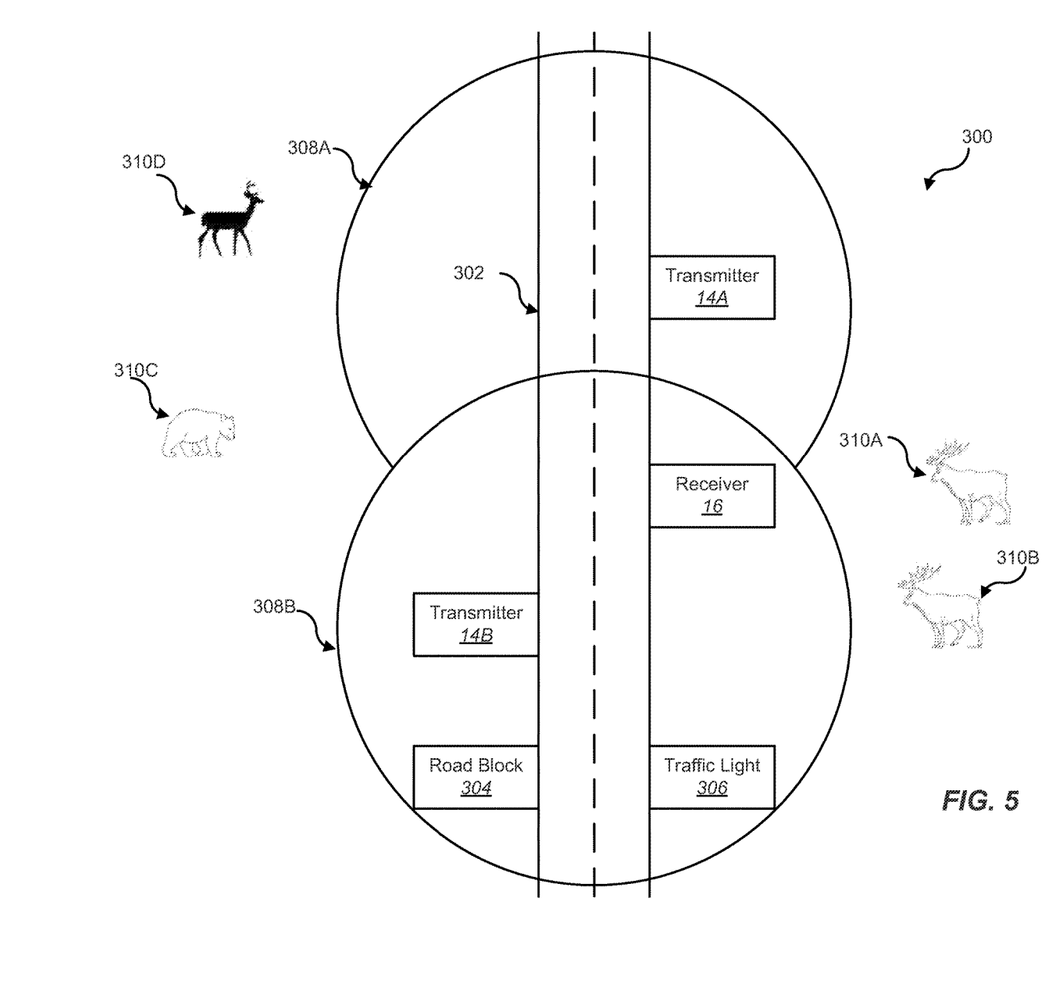
FIG. 5 is a schematic diagram of an example road tracking system in accordance with the present disclosure.

Referring now to FIG. 5, a road tracking system 300 is shown. The road tracking system 300 includes a road 302 that may be referenced as an object or area of danger for wildlife 310A-D. Wildlife 310A-D may be situated at any location relative to the road 302. A plurality of transmitters 14A-B may be used to create energy fields 308A-B in proximity to the road 302. When the wildlife 310A-D moves into the energy fields 308A-B, tracking devices carried by the wildlife 310A-D may be activated in some way to create a return signal receptive by receiver 16. Receiver 16 may function using, for example, receiver module 30 described above, to initiate one or more mitigating acts, such as, for example, operating a road block 304 or a traffic light 306 that warns drivers on the road 302 as to the presence of wildlife 310A-D, or operating a sound or light generating device that scares away the wildlife.

The road tracking system 300 may be most relevant to larger animals such as, for example, deer, elk, moose, bear, and antelope. However, the system 300 may also be used for smaller animals such as, for example, badgers, raccoons, or other wildlife such as reptiles or birds. System 300 may be also be useful for tracking and protecting domesticated animals such as bovines and equines that are sometimes grazing an open range lands with little or no physical barriers between them and the road 302.

The tracking device 12 carried by wildlife 310A-D may include a tag that is attached to the animals via any desired tagging system or method. Some types of tagging systems may reduce potential harm to the wildlife to which the tag is mounted and limit physical contact between the wildlife and those applying the tag. In one example, a tagging campaign may focus on applying tags to a few animals or birds in a large herd or flock of the wildlife that may be in proximity to the road 302. In other examples, a tagging campaign may focus on large breeding males and mature females of a herd with the expectation that the remainder of the herd will normally follow along with the dominant herd members.

As compared to existing animal tags and tagging methods, the tags and tagging systems disclosed herein may, in at least some examples, be deployed rapidly with minimal impact to the wildlife. For example, due to the relatively small size of the tag and lack of moving parts or power requirements, it is envisioned that an air powered gun or similar device may fire the tag at the animal. The tag may be positioned within an adhesive glue ball or other structure that is constructed to attach to the hair, skin or fur of a given wildlife.

Figure 6:
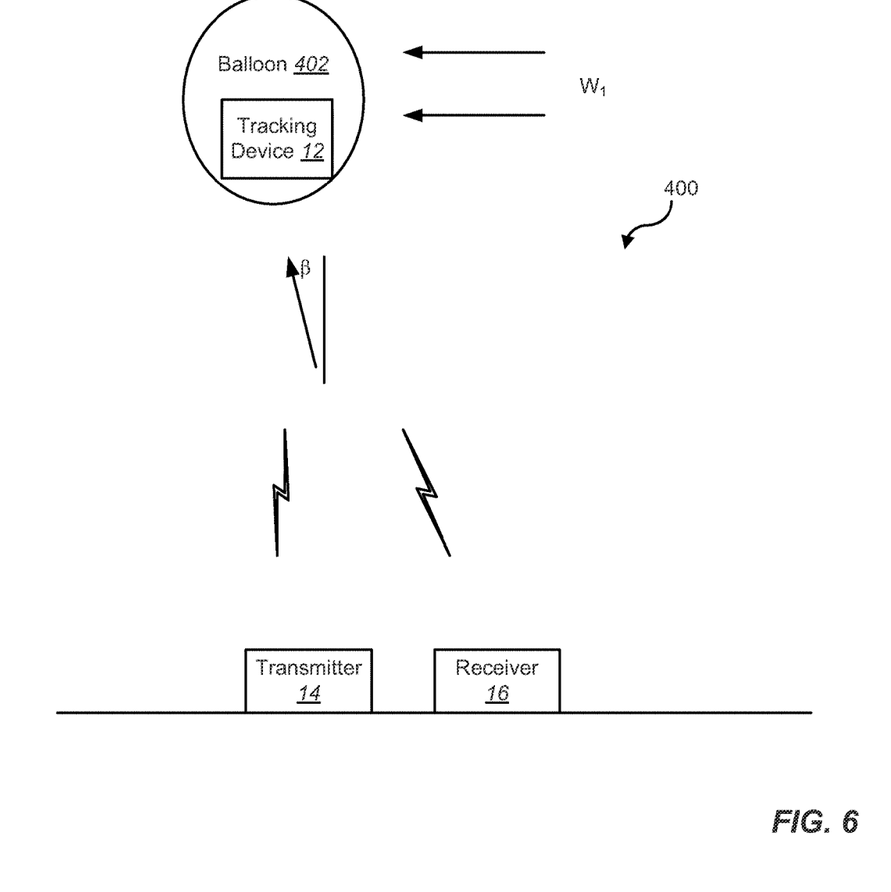
FIG. 6 is a schematic diagram showing an example balloon tracking system for determining wind speed in accordance with the present disclosure.

Referring now to FIG. 6, another example system utilizing the tracking feature disclosed herein is described. FIG. 6 shows a balloon tracking system 400 that may be used in the field of atmospheric physics for measuring a vertical profile of wind speeds at a given geographical location. A wind speed profile obtained using the balloon tracking system 400 may be useful in a number of applications including, for example, weather models, pollution disbursement modules, air traffic control and resource analysis for wind farms.

Commonly used technologies for measuring wind speed include LIDAR (light detection and ranging), SODAR (sonic detection and ranging), balloons and meteorological towers instrumented with anemometers. LIDAR uses laser pulses that scatter off of atmospheric aerosols and return to the instrument. By computing a Doppler shift between the outgoing frequency and return frequency, the wind speed may be calculated at various heights. Most current LIDAR systems are limited to measurements of less than 300 meters above ground level. SODAR works using a similar principle as LIDAR, except that sound pulses are used instead of lasers. Most current SODAR systems are limited to measurements of less than 300 meters above ground level. Instrument towers may involve the erection of a tubular or lattice tower outfitted with anemometers at various heights. Such towers are typically limited to about 60 meters in height.

Application of the tracking system features disclosed herein (i.e., a passive tag) attached to a balloon may provide an alternative to the LIDAR, SODAR and meteorological tower instruments with anemometers described above. As shown in FIG. 6, a passive tag, which is part of tracking device 12, may be carried by a balloon 402. Wind $W_1$ moves the balloon 402 to an angle β relative to a vertical plane. The receiver 16 may operate to determine a speed of the wind $W_1$ based on a number of factors including a relative position of the balloon 402 to a reference point (e.g., a position of the receiver 16) determined by signals transmitted by the tracking device 12.

The balloon 402 may be released from ground level, and the signal return from the tracking device 12 is used to compute the relative position of the balloon as it floats away unattached. Using established mathematic equations, a software algorithm may compute the speed of the wind $W_1$ based on the relative position of the tagged balloon as it floats upward into the atmosphere, yielding the current wind speed as a function of height relative to a reference point on the ground. It may be advantageous to use this kind of approach rather than existing methodologies due to the relative low cost nature of the tag and the propensity for nonrecovery of weather balloon components. Also, traditional radar systems may rely on the size, shape and orientation of the radar cross-section to get a new return signal. With the passive harmonic tags system noted herein, the return frequency is typically twice the transmission frequency. The tag typically will be the only object radiating at that frequency within the range of the receiving antenna. This allows for an extremely high discrimination of the tagged balloon against the background, and allows the radar to detect the balloon tag at relatively long ranges, outside the typical ranges of LIDAR, SODAR, and large radar ranging balloons, and at a much lower cost than typical battery powered radiosonde devices containing meteorological instruments.

Figure 7:
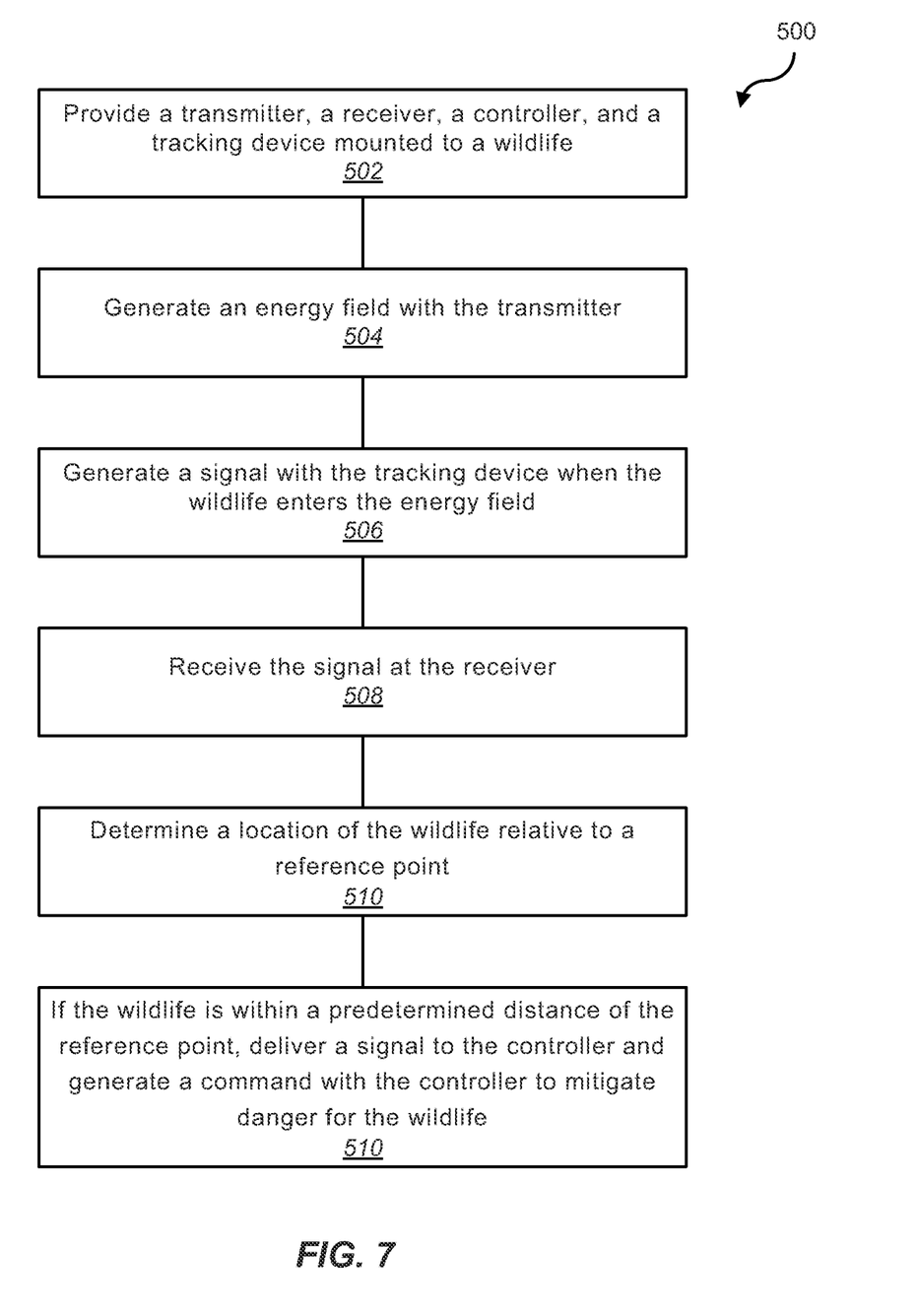
FIG. 7 is a flow diagram showing steps of an example method in accordance with the present disclosure.

Referring now to FIG. 7, an example method 500 in accordance with one aspect of the present disclosure is disclosed. In a first step 502, the method includes providing a transmitter, a receiver, a controller, and a tracking device. The tracking device is mounted to a wildlife. In a second step 504, the system generates an energy field with the transmitter. In a step 506, the tracking device generates a signal when the wildlife enters the energy field. In a step 508, the signal is received at the receiver. The method also includes determining a location of the wildlife relative to a reference point in a step 510. If the wildlife is within a predetermined distance of the referenced point, a signal is delivered to the controller and the command is generated with the controller to mitigate danger for the wildlife in a step 510. Alternative methods may include more or fewer steps as compared to those of method 500.

Figure 8:
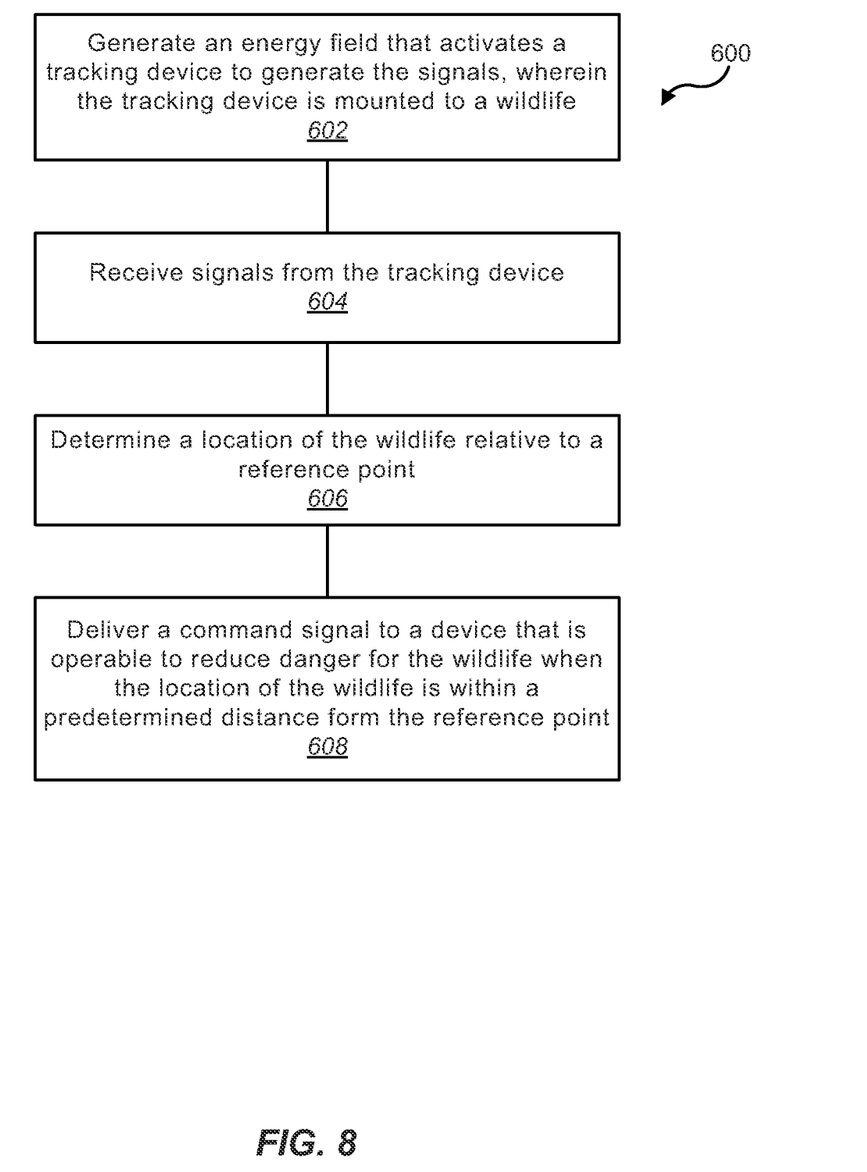
FIG. 8 is a flow diagram showing steps of another example method in accordance with the present disclosure.

Referring to FIG. 8, another example method 600 includes generating an energy field that activates a tracking device to generate a signal, wherein the tracking device is mounted to a wildlife in a step 602. Next, in a step 604, signals are received from the tracking device. A location of the wildlife is determined relative to a reference point in a step 606. A command signal is delivered to a device that is operable to reduce danger for the wildlife and the location of the wildlife is within a predetermined distance from the reference point in a step 608. Alternative methods may include more or fewer steps as compared to those of method 600.

Figure 9:
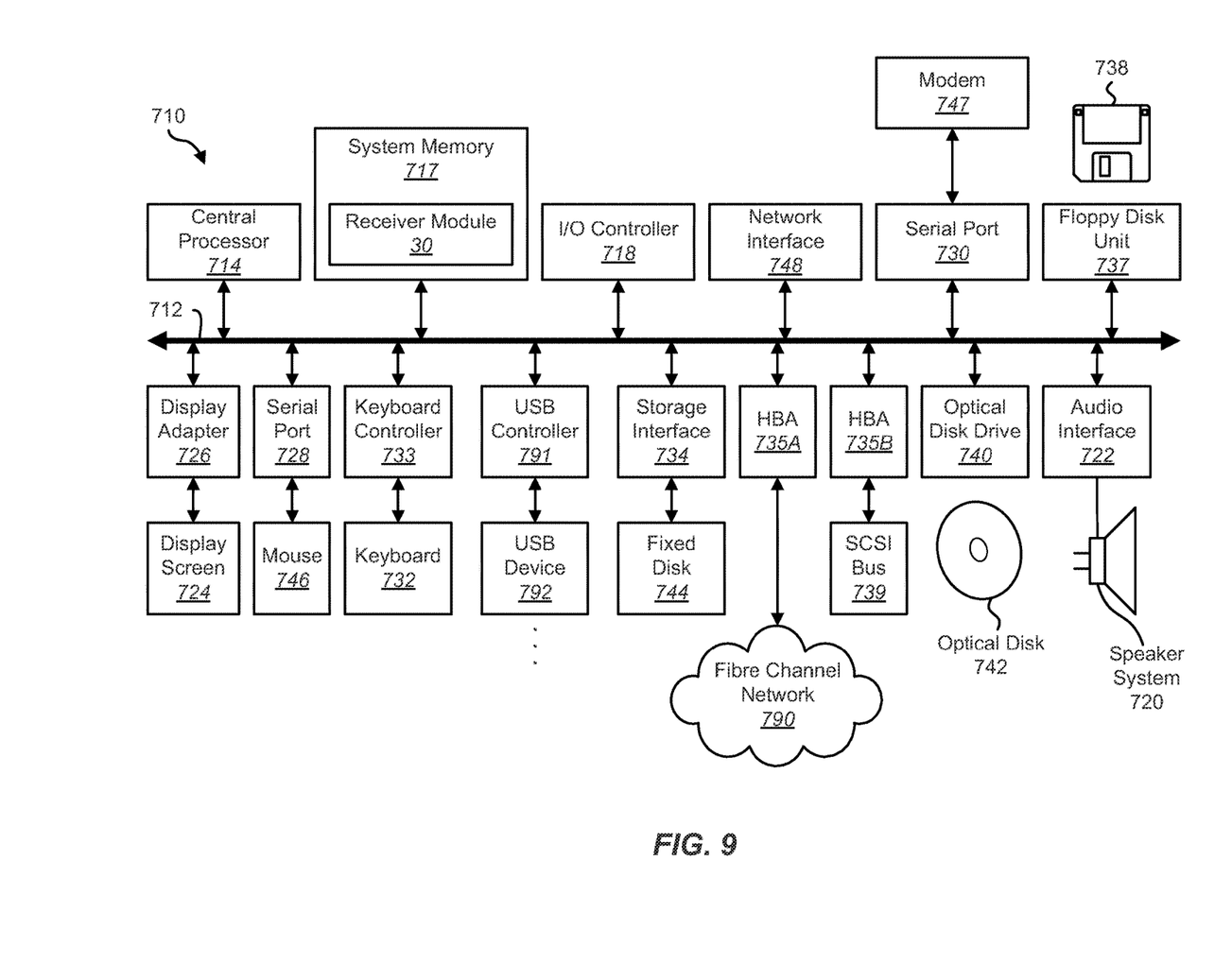
FIG. 9 depicts a block diagram of a computer system suitable for implementing the present systems and methods.

FIG. 9 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), multiple USB devices 892 (interfaced with a USB controller 890), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the receiver module 30 to implement the present systems and methods may be stored within the system memory 817. Applications resident with computer system 810 are generally stored on and accessed via a non-transitory computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard non-transitory computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in a non-transitory computer-readable medium such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
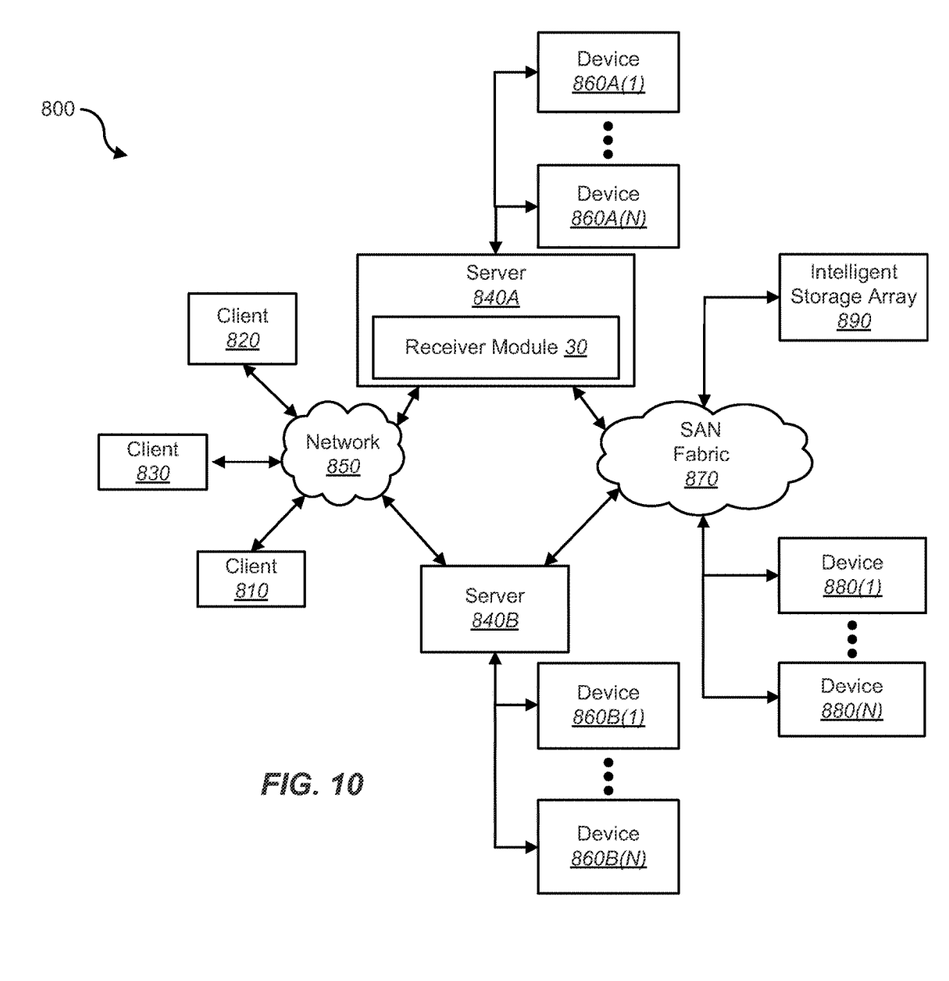
FIG. 10 is a block diagram depicting a network architecture in which client systems, as well as storage servers (any of which can be implemented using computer system), are coupled to a network.

FIG. 10 is a block diagram depicting a network architecture 900 in which client systems 910, 920 and 930, as well as storage servers 940A and 940B (any of which can be implemented using computer system 910), are coupled to a network 950. In one embodiment, the receiver module 30 may be located within a server 940A, 940B to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920, and 930 to network 950. Client systems 910, 920, and 930 are able to access information on storage server 940A or 940B using, for example, a web browser or other client software (not shown). Such a client allows client systems 910, 920, and 930 to access data hosted by storage server 940A or 940B or one of storage devices 960A(1)-(N), 960B(1)-(N), 980(1)-(N) or intelligent storage array 990. FIG. 10 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for tracking a tagged bird, said method comprising:
   providing a transmitter, a receiver, a controller, and a tracking device, and mounting the tracking device to a bird;
   generating an energy field with the transmitter;
   generating a first signal with the tracking device when the bird enters the energy field;
   receiving the first signal at the receiver;
   determining a location of the bird relative to a reference point; and
   delivering a second signal to the controller and generating a command with the controller to mitigate danger for the bird based on a determination that the bird is within a predetermined distance of the reference point;
   wherein the command includes slowing down a wind turbine.

2. The computer-implemented method of claim 1, wherein the tracking device comprises a passive harmonic radar tag that re-radiates said first signal at a different frequency than a frequency of the energy field.

3. The computer-implemented method of claim 1, wherein the tracking device comprises an unpowered active tag that is powered by the energy field.

4. A method of tracking a tagged bird and reducing danger thereto from a wind turbine, said method comprising:
   providing a transmitter, a receiver, a controller and a tag which is mounted on the bird;
   generating an energy field with the transmitter, the tag generating a first signal in response to the energy field when the bird enters the energy field;
   receiving said first signal at the receiver;
   determining from said first signal the location of the bird relative to a reference point; and
   delivering a second signal to the controller and generating by the controller a command signal which causes slowing of the wind turbine when the bird is within a predetermined distance of the reference point.

5. Apparatus for tracking a tagged bird and reducing danger thereto from a wind turbine, and configured for use in conjunction with a tag which is mounted on the bird, the apparatus comprising:
   a transmitter for generating an energy field so that the tag generates a first signal in response to the energy field when the bird enters the energy field;
   a receiver for receiving the first signal generated by the tag; and
   a controller which (i) determines from the said first signal the location of the bird relative to a reference point, and (ii) provides a command signal which causes slowing of the wind turbine when the bird is within a predetermined distance of the reference point.

6. The apparatus of claim 5 wherein said transmitter comprises a continuous-wave radar.

7. The apparatus of claim 5 wherein said transmitter comprises a pulse radar.

8. The apparatus of claim 5 wherein said tag is a half-wave dipole resonant tag.

* * * * *